US010225608B2

(12) United States Patent
Shigeta et al.

(10) Patent No.: US 10,225,608 B2
(45) Date of Patent: Mar. 5, 2019

(54) GENERATING A REPRESENTATION OF A USER'S REACTION TO MEDIA CONTENT

(71) Applicant: Sony Corporation, Tokyo (JP)

(72) Inventors: Osamu Shigeta, Tokyo (JP); Naoki Saito, Chiba (JP); Reiko Miyazaki, Tokyo (JP); Takayuki Kaneko, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/891,846

(22) PCT Filed: Apr. 18, 2014

(86) PCT No.: PCT/JP2014/061071
§ 371 (c)(1),
(2) Date: Nov. 17, 2015

(87) PCT Pub. No.: WO2014/192457
PCT Pub. Date: Dec. 4, 2014

(65) Prior Publication Data
US 2016/0142767 A1  May 19, 2016

(30) Foreign Application Priority Data

May 30, 2013 (JP) ................................. 2013-113768

(51) Int. Cl.
*H04N 21/442* (2011.01)
*G06K 9/00* (2006.01)
(Continued)

(52) U.S. Cl.
CPC ... *H04N 21/44218* (2013.01); *G06K 9/00302* (2013.01); *H04N 21/4223* (2013.01);
(Continued)

(58) Field of Classification Search
None
See application file for complete search history.

(56) References Cited

U.S. PATENT DOCUMENTS 8,635,637 B2 * 1/2014 Krum ............... H04N 21/44218
348/222.1
2005/0289582 A1 12/2005 Tavares et al.
(Continued)

FOREIGN PATENT DOCUMENTS

CN  102170591 A  8/2011
JP  7-129594 A  5/1995
(Continued)

OTHER PUBLICATIONS

International Search Report from International Publication PCT/JP2014/061071 dated Jul. 1, 2014.
(Continued)

*Primary Examiner* — Hoang Vu A Nguyen Ba
(74) *Attorney, Agent, or Firm* — Lerner, David, Littenberg, Krumholz & Mentlik, LLP

(57) ABSTRACT

[Object] To provide a client apparatus, control method, system and program capable of presenting emotion expression data showing viewing reactions of other users or a user himself or herself.
[Solution] There is provided a client apparatus including: an acquisition unit that acquires a reaction of a viewing user to a content; an emotion estimation unit which estimates an emotion of a viewing user based on reaction information of the viewing user acquired by the acquisition unit; a determination unit that determines emotion expression data representing an emotion estimated by the emotion estimation unit; and an output unit that outputs emotion expression data determined by the determination unit.

7 Claims, 12 Drawing Sheets

(51) Int. Cl.
  *H04N 21/422* (2011.01)
  *H04N 21/431* (2011.01)
  *H04N 21/4223* (2011.01)
  *H04N 21/4788* (2011.01)
(52) U.S. Cl.
  CPC ... *H04N 21/42203* (2013.01); *H04N 21/4312* (2013.01); *H04N 21/4788* (2013.01)

(56) References Cited

U.S. PATENT DOCUMENTS

| | | | |
|---|---|---|---|
| 2007/0271580 A1* | 11/2007 | Tischer | H04H 60/07 725/35 |
| 2009/0063995 A1* | 3/2009 | Baron | G06Q 10/10 715/753 |
| 2009/0094628 A1* | 4/2009 | Lee | G06Q 30/02 725/10 |
| 2009/0265430 A1* | 10/2009 | Bechtel | G06F 17/30994 709/205 |
| 2010/0182501 A1* | 7/2010 | Sato | G06T 11/60 348/441 |
| 2011/0214141 A1* | 9/2011 | Oyaizu | H04N 7/173 725/12 |
| 2012/0155671 A1 | 6/2012 | Suzuki | |
| 2012/0222057 A1 | 8/2012 | Sadowsky et al. | |
| 2012/0311032 A1* | 12/2012 | Murphy | G07F 17/3225 709/204 |
| 2012/0324492 A1 | 12/2012 | Treadwell, III et al. | |
| 2013/0179911 A1* | 7/2013 | Dang | H04N 21/42201 725/12 |
| 2013/0182907 A1* | 7/2013 | Higa | G06F 17/30268 382/103 |
| 2013/0232515 A1* | 9/2013 | Rivera | H04N 21/44213 725/12 |
| 2013/0247078 A1* | 9/2013 | Nikankin | H04N 21/44204 725/13 |

FOREIGN PATENT DOCUMENTS

| | | |
|---|---|---|
| JP | H07129594 A | 5/1995 |
| JP | 2009-182410 A | 8/2009 |
| JP | 2010-114808 A | 5/2010 |
| JP | 2011-182109 A | 9/2011 |
| JP | 2012-090091 A | 5/2012 |
| JP | 2012-129800 A | 7/2012 |
| JP | 2013-070155 A | 4/2013 |

OTHER PUBLICATIONS

Extended European Search Report for Application No. 14804782.2 dated Sep. 30, 2016.
Chinese Office Action for Application No. 201480029851.7 dated Jan. 19, 2018.
Japanese Office Action for Application No. 2015-519740 dated Mar. 13, 2018.

* cited by examiner

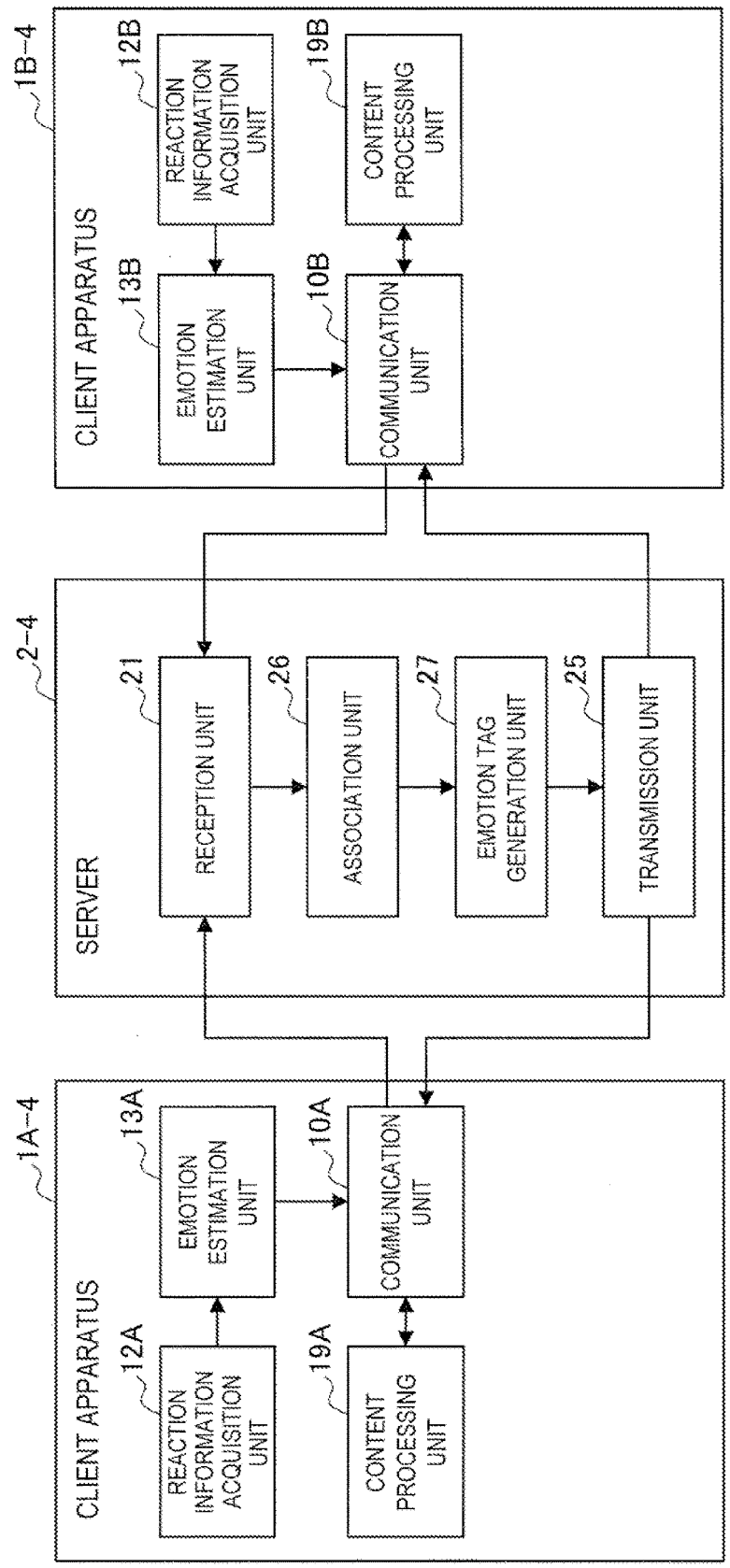

GENERATING A REPRESENTATION OF A USER'S REACTION TO MEDIA CONTENT

CROSS-REFERENCE TO RELATED APPLICATION

The present application is a national phase entry under 35 U.S.C. § 371 of International Application No. PCT/JP2014/061071 filed Apr. 18, 2014, published on Dec. 4, 2014 as WO 2014/192457 A1, which claims priority from Japanese Patent Application No. JP 2013-113768 filed in the Japanese Patent Office on May 30, 2013.

TECHNICAL FIELD

The present disclosure relates to a client apparatus, a control method, a system, and a program.

BACKGROUND ART

In recent years, communication between users has become popular, by the development of networks. In such a situation, a style has become widespread in which a content is viewed while empathizing various emotions, such as liveliness, sadness, laughter, surprise or angriness, together with other users in remote locations. An empathy system such as described below has been proposed, for example, as technology for knowing an empathy of emotions with other users viewing a same content, and reactions of the other users.

In Patent Literature 1, a content reproduction apparatus has been proposed which causes reactions of other users viewing a same content to be reflected in a content in real time, at the time of viewing the content, and provides a sense of presence. Specifically, the content reproduction apparatus disclosed in Patent Literature 1 acquires a degree of liveliness of a plurality of users based on liveliness information of each user collected in real time, and combines liveliness effects, constituted from video or audio expressing a degree of liveliness of the plurality of users, with a content and performs reproduction.

In Patent Literature 2, an information processing system has been proposed in which a user viewing a content can know reaction audio for a same content of many other users in real time, and can share an emotion such as being deeply moved with other users.

In Patent Literature 3, a viewing system has been proposed which can simply obtain empathy, by collecting audio of a talker of his or her own terminal while receiving and displaying a broadcast program, performing sending to a server by converting into character data, and receiving character data of other terminals from the server and the same time as this and collectively performing a display on a display screen.

CITATION LIST

Patent Literature

Patent Literature 1: JP 2011-182109A
Patent Literature 2: JP 2012-129800A
Patent Literature 3: JP 2012-90091A

SUMMARY OF INVENTION

Technical Problem

However, in the case where audio generated by a user at the time of viewing is used, such as in the above described Patent Literature 2 and 3, while the time of character input will be saved, a situation will be assumed in which a mutual conversation is overheard. For example, by transferring a family conversation or the like which is not related to a reaction of a content to all other users, it will become an obstruction of content viewing of different users.

Further, while Patent Literature 1 combines liveliness effects, constituted from video or audio expressing a degree of liveliness of a plurality of users, with a content and performs reproduction, it will become an obstruction of the viewing of a user when a companion video is combined with a content and reproduced.

Accordingly, the present disclosure proposes a new and improved client apparatus, control method, system and program capable of presenting emotion expression data showing viewing reactions of other users or a user himself or herself, without obstructing the viewing of the user.

Solution to Problem

According to the present disclosure, there is provided a client apparatus including: an acquisition unit that acquires a reaction of a viewing user to a content; an emotion estimation unit which estimates an emotion of a viewing user based on reaction information of the viewing user acquired by the acquisition unit; a determination unit that determines emotion expression data representing an emotion estimated by the emotion estimation unit; and an output unit that outputs emotion expression data determined by the determination unit.

According to the present disclosure, there is provided a control method including: a step of acquiring a reaction of a viewing user to a content; a step of estimating an emotion of to viewing user based on the acquired reaction information of the viewing user; a step of determining emotion expression data representing the estimated emotion; and a step of outputting the determined emotion expression data.

According to the present disclosure, there is provided a system including: a client apparatus having an acquisition unit that acquires a reaction of a viewing user to a content, an emotion estimation unit that estimates an emotion of a viewing user based on reaction information of the viewing user acquired by the acquisition unit, a determination unit that determines emotion expression data based on an integration result of estimation emotion results received from a server, and an output unit that outputs emotion expression data determined by the determination unit; and a server having an integration unit that integrates emotion estimation results of the viewing users received from a plurality of the client apparatuses.

According to the present disclosure, there is provided a program for causing a computer to function as: an acquisition unit that acquires a reaction of a viewing user to a content; an emotion estimation unit that estimates an emotion of a viewing user based on reaction information of the viewing user acquired by the acquisition unit; a determination unit that determines emotion expression data representing an emotion estimated by the emotion estimation unit; and an output unit that outputs emotion expression data determined by the determination unit.

Advantageous Effects of Invention

According to the present disclosure such as described above, it becomes possible to present emotion expression data showing viewing reactions of other users or a user himself or herself.

BRIEF DESCRIPTION OF DRAWINGS

FIG. 12 is a block diagram which shows an example of an internal configuration of a client apparatus according to a fourth embodiment.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

The description will be given in the following order.
1. Outline of the viewing reaction feedback system according to an embodiment of the present disclosure
2. Each of the embodiments
2-1. First embodiment
2-1-1. Configuration
2-1-2. Operation processes
2-2. Second embodiment
2-3. Third embodiment
2-4. Fourth embodiment
3. Summary

Figure 1:
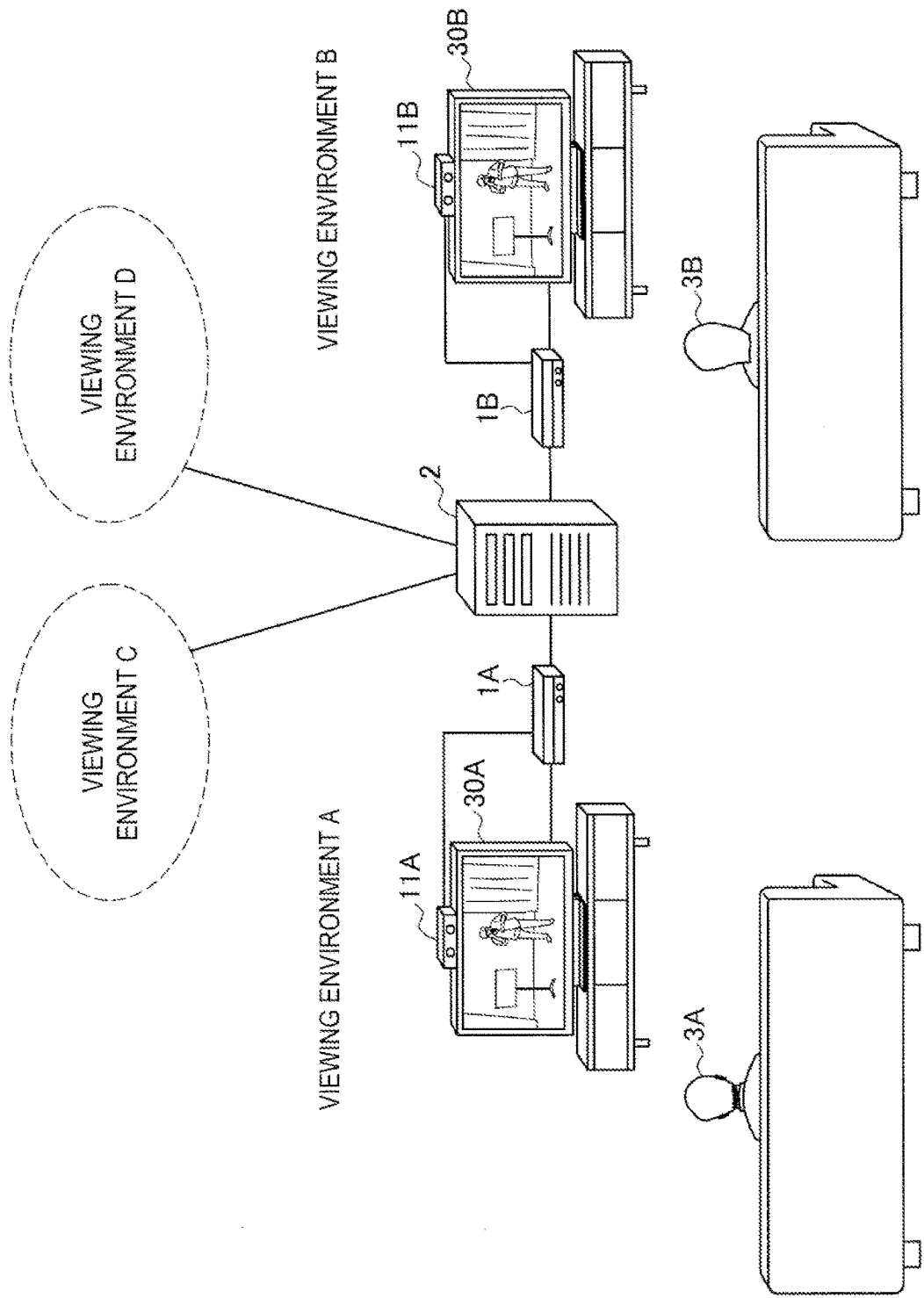
FIG. 1 is a figure for describing an outline of a viewing reaction feedback system according to an embodiment of the present disclosure.

1. Outline of the viewing reaction feedback system according to an embodiment of the present disclosure First, an outline of a viewing reaction feedback system according to an embodiment of the present disclosure will be described by referring to FIG. 1. FIG. 1 is a figure for describing an outline of a viewing reaction feedback system according to an embodiment of the present disclosure.

As shown in FIG. 1, in a viewing environment A, a viewing user 3A is viewing a content by a television apparatus 30A (an example of an information presentation apparatus) connected to a client apparatus 1A, and in a viewing environment B, a viewing user 3B is viewing the same content by a television apparatus 30B connected to a client apparatus 1B. Further, other users in other viewing environments C and D are similarly viewing the same content by their own client apparatuses. Hereinafter, in the case where it may not be necessary to individually describe each of the client apparatuses 1A and 1B, they will be called a client apparatus 1.

Each of the client apparatuses 1 are connected to a server 2 (cloud) via respective networks.

Each of the television apparatuses 30A and 30B are an example of an information presentation apparatus which outputs a content, and other than a video display apparatus such as shown in FIG. 1, may be implemented by an audio reproduction apparatus (speaker). Further, it may be a video display apparatus in which a speaker is built in.

Further, sensors 11A and 11B for detecting reactions of the viewing users are included in each of the television apparatuses 30A and 30B. Hereinafter, in the case where it may not be necessary to individually describe each of the sensors 11A and 11B, they will be called a sensor 11.

The sensor 11 is implemented, for example, by a camera (imaging apparatus) or a microphone (sound collection apparatus), and acquires movements, facial expressions or audio of a viewing user. The camera may be a special camera which can acquire depth information of a photographic subject (viewing user), such as Microsoft's Kinect, and the microphone (hereinafter, called a microphone) may be a plurality of microphones set such as in a microphone array. The sensor 11 outputs reaction information (a detection result), which shows an acquired reaction of a viewing user, to the client apparatus 1.

In such a configuration, the viewing reaction feedback system according to an embodiment of the present disclosure can provide empathy of emotions, by performing feedback of emotion expression data (nonverbal reactions or the like, which will be described below), which shows viewing reactions of other viewing users, to a viewing user.

For example, at the time when viewing a comedy program, when a laughing voice, applause or a laughing face of the site is output, a user will have a more interesting feeling himself or herself, compared to the case of not. Further, at the time when viewing a science program, when the appearance of nodding, a convincing voice or an admiring voice is heard, a user will have a strong feeling of his or her own conviction or understanding. Further, at the time when viewing a sports match, when hearing cheering, liveliness will be strong, and in contrast, when a disappointed voice is heard, regrettable feelings will be strong. Further, at the time when viewing a program with feelings of being deeply moved, when hearing a sniffling sound or seeing a face with flowing tears, feelings of being deeply moved will be strong. In this way, when an emotion is shared by the appearance (performers of a program) of other users viewing a content, a user will have this emotion strengthened.

Usually, in the case of real person to person communication, communication is often established even if there is not necessarily anything verbal (a conversation). For example, at the time when viewing a television program together or the like, communication is established by sharing this space, even if only having reactions such as laughter or facial expressions without conversation. Therefore, at the time when watching a same content with a user in a remote location, when a video of the companion is displayed in a state superimposed on a part of a screen of the content, even if there is no conversation, it will become a hindrance of content viewing.

(Background)

Here, a method will be considered, such as that below in accordance with the condition, as a method in which a plurality of users share viewing reactions by viewing a same content in remote locations.

(a) The Case where Viewing Content by Users Who are Acquainted

A condition will be assumed in which emotions are shared by viewing a same content by specific users who are acquainted such as friends or acquaintances. In this case, it is possible to exchange emotions, by using a communication service capable of transmitting and receiving video, audio, text or the like, while viewing a same content. However, in the case of text, it may be necessary to perform character input while viewing a content, and so content viewing will be obstructed. Further, in the case where using a video or audio, while the time of character input is saved, a mutual conversation or video will be entirely overheard. For example, a family conversation or the like which is not related to a content is transferred to all other users, and becomes an obstruction of content viewing of the other users.

(b) The Case where Viewing Content by Non-Acquainted Users

For example, at the time when a user is watching sports at home, if emotions are shared with an unspecified large number of other users, such as other supporters of the team which the user is supporting, and liveliness can be performed together, the content viewing can be more enjoyable. Usually, in the case where watching sports by a television apparatus, audio of the supporters of both teams (audio collected at the game site) can be heard, and so it will be difficult to obtain a sense of being lively together with other supporters of the team which the user is supporting.

Figure 2:
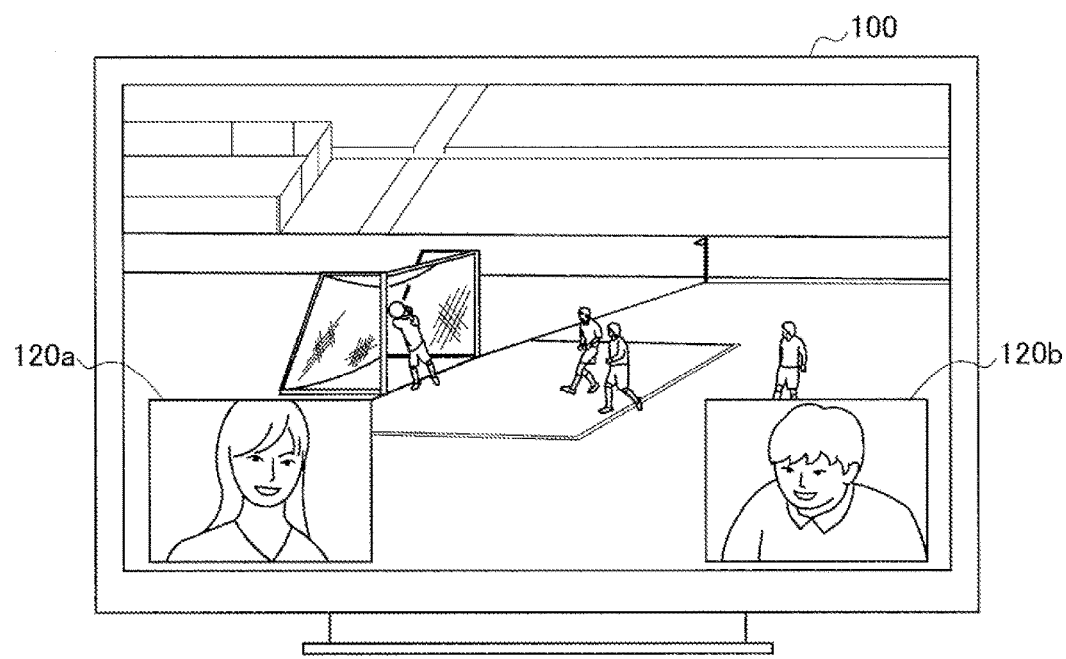
FIG. 2 is a figure for describing a case in which empathy is strengthened by displaying videos of a user and other users.

In this case, for example, as shown in FIG. 2, by presenting a video 120*a* and audio of another supporter and a video 120*b* and audio of himself or herself (viewing user 3A), along with cheering usually broadcast by the television apparatus 100, or mutually in real time, it becomes possible to strengthen empathy with other supporters. However, audio and a video of himself or herself (viewing user 3A) is transferred as it is to an unspecified large number of users, and a problem of privacy will occur.

Accordingly, it has reached creating the viewing reaction feedback system according to each embodiment of the present disclosure by focusing on the above mentioned circumstances. The viewing reaction feedback system according to the present embodiment can feedback emotion expression data showing viewing reactions of other users, and can cause emotions to be empathized, by a method which can protect the privacy of a user, without obstructing the viewing of the user, while viewing a same content with specific or an unspecified large number of other users.

In particular, in order not to obstruct the viewing of a user, and to also protect the privacy of the user, nonverbal reactions are used, for example, as emotion expression data showing viewing reactions of other users. In the present disclosure, a nonverbal reaction is a word representing an emotion, such as an imitative word, which includes a "mimetic word" which is a word representing, by a sound, a non-generated sound such as a condition or a feeling, and an "onomatopoeic word" which is a word representing sound or voice generated by an object, an exclamation, a laughing voice or a crying voice. In the viewing reaction feedback system according to the present embodiment, nonverbal reactions representing emotions estimated from reactions of a user are presented by different sound sources, for example, without presenting raw audio of the user directly to other users, and so the privacy of the user is protected. Further, nonverbal reactions are presented based on emotions estimated from reactions to a viewing content, without having a family conversation or the like which is not related to the viewing content detected, and so will not obstruct the viewing of other users by having raw audio of the user being overheard by other users.

Such a viewing reaction feedback system according to the present disclosure will be specifically described by including the following plurality of embodiments.

2. Each of the embodiments 2-1. First Embodiment

First, the viewing reaction feedback system according to a first embodiment will be described by referring to FIG. 3 to FIG. 8.

2-1-1. Configuration

Figure 3:
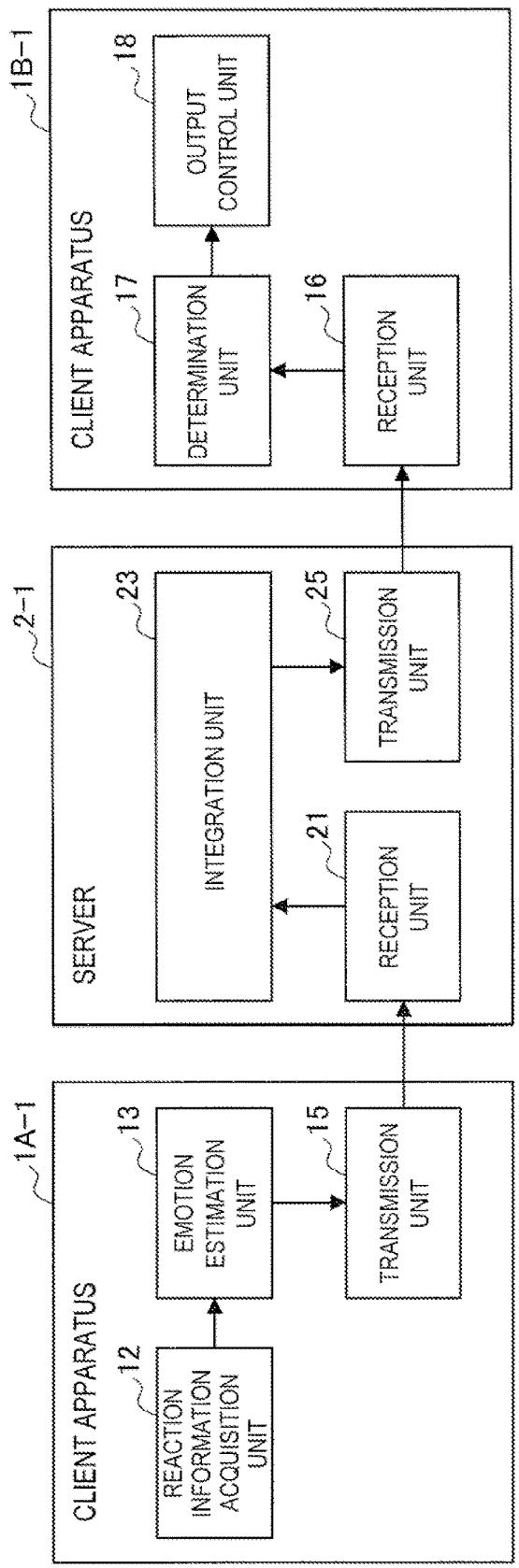
FIG. 3 is a block diagram which shows an example of an internal configuration of each apparatus which forms the viewing reaction feedback system according to a first embodiment.

FIG. 3 is a block diagram which shows an example of an internal configuration of each apparatus which forms the viewing reaction feedback system according to the first embodiment. As shown in FIG. 3, the viewing reaction feedback system according to the present embodiment has a plurality of client apparatuses 1A-1 and 1B-1, and a server 2-1.

Client Apparatus 1A-1

The client apparatus 1A-1 is an apparatus which controls the viewing environment A shown in FIG. 1, and specifically, such as shown in FIG. 3, has a reaction information acquisition unit 12, an emotion estimation unit 13, and a transmission unit 15.

The reaction information acquisition unit 12 acquires reaction information (imaging image, audio data) of a viewing user from the sensor 11A (refer to FIG. 1) implemented by a camera or a microphone, and outputs it to the emotion estimation unit 13. Here, the sensor 11A is not limited to a camera or a microphone, and may be an acceleration sensor or an angular acceleration sensor built into a mobile phone terminal or a smart phone which the viewing user 3A puts into a pocket or holds in a hand. In this case, the reaction information acquisition unit 12 can acquire acceleration information or angular acceleration information as reaction information of a viewing user. Further, it is possible for the reaction information acquisition unit 12 to acquire biological information such as a pulse, perspiration or body temperature, as reaction information of a viewing user, from a biological sensor (an example of the sensor 11A) worn by the viewing user 3A.

The emotion estimation unit 13 estimates an emotion of a viewing user, based on reaction information of the viewing user acquired by the reaction information acquisition unit 12. The emotion estimation unit 13 outputs estimated emotion information (an emotion estimation result) of the viewing user to the server 2-1 via the transmission unit 15.

Here, while various techniques can be considered for a model of estimated emotions, the "wheel of emotions"

presented by Robert Pluntchik, for example, may be used. The wheel of emotions is established from 8 applied emotions (fear, disappointment, regret, contempt, criticism, optimism, love and obedience) constituted from a combination of two points, with 8 base emotions (fear, surprise, sadness, hate, anger, anticipation, delight and acceptance), and various types of emotions are defined.

As an emotion estimation method by the emotion estimation unit 13, it may be, for example, a method which estimates an emotion from a facial expression or a body posture, by image processing a face image of the viewing user 3A, or it may be, for example, estimated by extracting only audio of a specific user by sound source separation by using a microphone, and using voice recognition technology from this audio data. For example, in the case where a smiling face or laughing voice has been detected, the emotion estimation unit 13 estimates an emotion of "laughter" or "enjoyment". Further, in the case where a crying face or a crying voice has been detected, the emotion estimation unit 13 estimates an emotion of "crying" or "sadness".

Further, otherwise, the emotion estimation unit 13 may estimate an emotion of a user, based on the size of the pupils, the body temperature, perspiration or the like of the user. In addition, in the case where text data of an SNS input by a user at the time of content viewing is acquired by the reaction information acquisition unit 12, an emotion of a user can be estimated by analyzing the input text data.

Server 2-1

The server 2-1 integrates emotion estimation results of each viewing user in a plurality of viewing environments, and transmits an integration result to the client apparatuses of each viewing environment. Specifically, as shown in FIG. 3, the server 2-1 according to the present embodiment has a reception unit 21, an integration unit 23 and a transmission unit 25.

The reception unit 21 receives an emotion estimation result of the viewing user 3A from the client apparatus 1A-1 via a network, and outputs it to the integration unit 23. Note that, while only an emotion estimation result is received from the client apparatus 1A-1 in the example shown in FIG. 3, the reception unit 21 receives emotion estimation results of each of the viewing users 3B to 3D from other viewing environments (for example, the viewing environments B, C and D).

The integration unit 23 integrates emotion estimation results of a plurality of users, and transmits an integration result via a network to each client apparatus (here, the client apparatus 1B-1 as an example) via the transmission unit 25. The integration result is, specifically, statistical data of the emotion estimation results of a plurality of viewing users. The integration unit 23 may integrate emotion estimation results of specific viewing users, or may integrate emotion estimation results of an unspecified large number of viewing users.

For example, there is the number of integrated users, the male-female ratio, the age distribution, the proportion of integrated emotion estimation results (for example, laughter 60%, surprise 20%, no reaction 20% or the like), the score of each emotion estimation result or the like in such statistical data. The score of an emotion estimation result sets 1.0 as a maximum score, for example, and attaches a score of 0.8 if a roaring laugh, a score 0.2 if a light laugh or the like.

Further, as will be described below, since there will be cases where the categorization of emotion expression data (a female voice, a male voice or the like) changes in accordance with the details of a content, the integration unit 23 may include metadata of the content in an integration result. Information such as a content categorization ID (for example, TV, video, video site) the title, broadcast time, genre, performers, scriptwriter or producer, a URL (in the case of an Internet video), a list of tweets associated with a content or the like can be included, for example, as an example of metadata.

Client Apparatus 1B-1

The client apparatus 1B-1 is an apparatus which controls the viewing environment B shown in FIG. 1, and determines emotion expression data, based on an integration result transmitted from the server 2-1, and outputs it from an information presentation apparatus (for example, the television apparatus 30B).

Specifically, as shown in FIG. 3, the client apparatus 1B-1 has a reception unit 16, a determination unit 17 and an output control unit 18. The reception unit 16 receives an integration result (statistical data) of emotion estimation results of a plurality of viewing users from the server 2-1 via a network, and outputs it to the determination unit 17.

The determination unit 17 determines emotion expression data, based on the integration result. For example, in the case of a high proportion of the emotion of "laughter", the determination unit 17 determines emotion expression data representing the emotion of "laughter". Such emotion expression data is formed, for example, by audio data or text data. Emotion expression data representing the emotion of "laughter" may be, for example, the above described nonverbal reactions. Specifically, it may be, for example, audio data of a laughing voice (of a different sound source which is not the raw voice of the viewing user 3A) registered in advance, or text data of an onomatopoeic word such as "ahaha" or "hehehe". The privacy of each user is protected, by replacing with a different sound source.

Further, it can perform a determination for emotion expression data which is formed by text data of an onomatopoeic word such as "oh" or the like, for example, as emotion expression data representing a high possibility of "cheering" estimated as an emotion showing a reaction of a user to a play near a goal of soccer. Further, it can perform a determination for emotion expression data which is formed by text data of an onomatopoeic word such as "sigh" as emotion expression data representing a high possibility of "disappointment", or "damn it" as emotion expression data representing "irritation", estimated as an emotion showing a reaction of a user at the time when a goal has been missed.

Further, it can perform a determination for emotion expression data which is formed by text data of a mimetic word such as "whimper", "sniffle" (sound of a sniffling nose) as emotion expression data representing a high possibility of "sadness" estimated at the time when viewing a documentary program. Further, emotion expression data can be determined which is formed by text data of a mimetic word such as "uh-huh" as emotion expression data representing a high possibility of a "convincing feeling" estimated at the time when viewing an educational program. Further, emotion expression data can be determined which is formed by text data of an onomatopoeic word such as "squeal" as emotion expression data representing a high possibility of "delight" estimated at the time when viewing a male idol, a female idol or a live performance of an artist. Further, emotion expression data can be determined which is formed by text data of a mimetic word such as "warm" as emotion expression data representing a high possibility of "comfort" estimated at the time when viewing an animal program.

Further, while the specific examples of nonverbal reactions (an example of emotion expression data) are not particularly limited, words such as "hooray", "awesome", "yikes", "aha", "yay" and "amazing", which represent an emotion of "wonder", for example, are also additionally included.

Heretofore, while some descriptions have been made for specific examples of nonverbal reactions (an example of emotion expression data), the determination unit 17 may use original expressions or popular words used on the Internet or by local specific communities, other than generally known mimetic words or onomatopoeic words.

Further, the determination unit 17 may change the presentation method of nonverbal reactions (an example of emotion expression data), in accordance with an integration result (statistical data). For example, in the case of a high proportion of the emotion of "laughter", the determination unit 17 may increase the tone or volume of a laughing voice to be determined as a nonverbal reaction, or may superimpose a laughing voice of the number of people (type) corresponding to the proportion of "laughter".

Further, the determination unit 17 may switch the type of emotion expression data to be determined in accordance with the condition or frequency, even if a same emotion. For example, in the case where the emotion of "laughter" is continuously estimated, the determination unit 17 changes and determines laughing voices of different types, without performing a determination for a same laughing voice. Further, the determination unit 17 may change the type of emotion expression data in accordance with a content being viewed. For example, in the case where an emotion of "delight" is estimated, and in the case where the content is a live performance of a female idol, the determination unit 17 estimates that the viewer demographic of this content is male, and so determines emotion expression data by male audio such as "oh". Further, in the case where the content is a live performance of a male idol, the determination unit 17 estimates that the viewer demographic of this content is female, and so determines emotion expression data by female audio such as "eek". Further, other than a viewer demographic of a content, the determination unit 17 may determine emotion expression data of a type corresponding to an attribute of the viewing users, such as the male to female ratio of the viewing users, which is included in an integration result. Note that, the determination unit 17 may determine emotion expression data in accordance with at least one of a viewer demographic of a content and an attribute of the viewing users.

The output control unit 18 performs a control so as to output emotion expression data determined by the determination unit 17 from the information presentation apparatus. For example, the output control unit 18 causes reproduction from a speaker (an example of an information presentation apparatus) in the case where the emotion expression data is audio data of a laughing voice, and causes a display superimposed on a content in the television apparatus 30B (an example of an information presentation apparatus) in the case where the emotion expression data is text data. Hereinafter, output examples of emotion expression data will be described by referring to FIG. 4 to FIG. 7.

Figure 4:
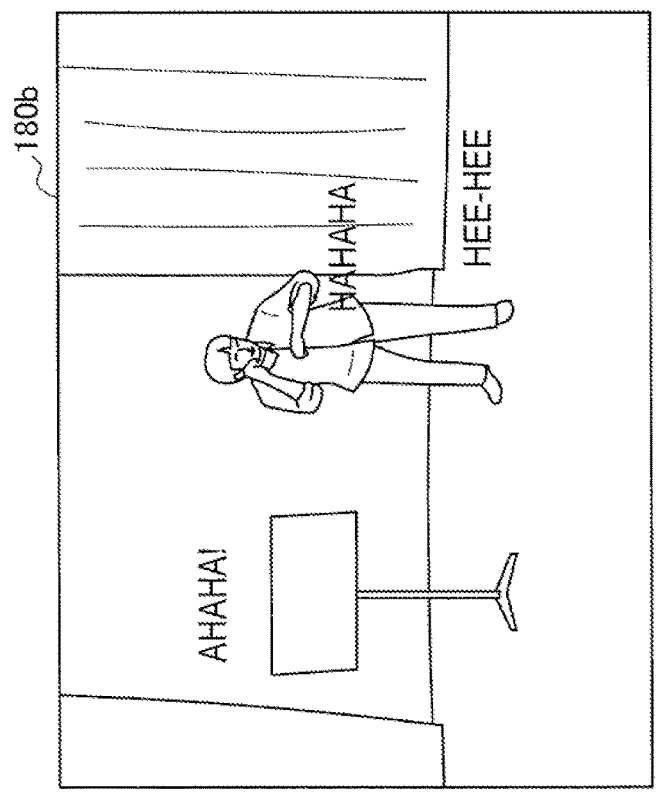
FIG. 4 is a figure which shows output examples in which emotion expression data (nonverbal reactions) formed by text data are displayed superimposed on a content.
Figure 4:
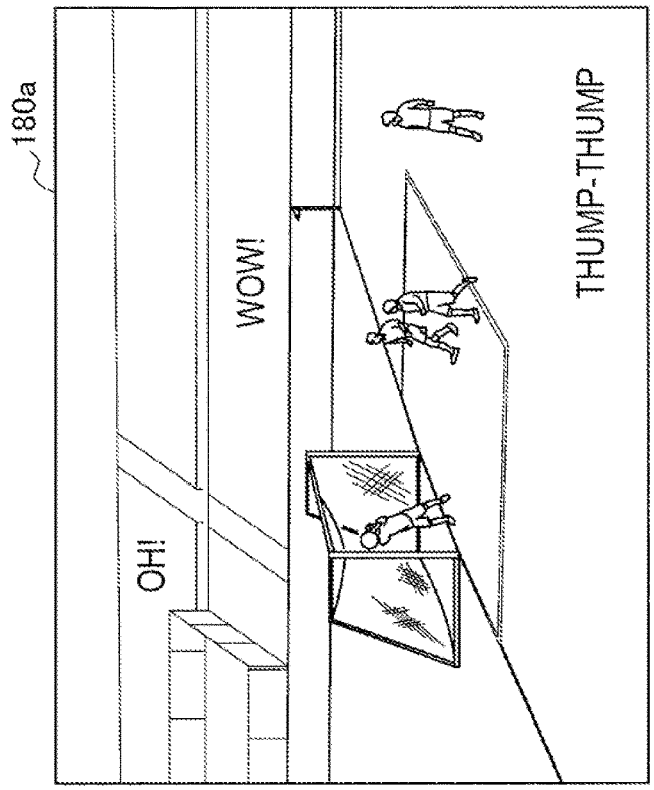

FIG. 4 is a figure which shows output examples in which emotion expression data (nonverbal reactions) formed by text data are displayed superimposed on a content. As shown on the left display screen 180a of FIG. 4, emotion expression data such as "oh!" and "wow!" representing an emotion of "cheering", and emotion expression data such as "thump-thump" representing an emotion of "nervousness", are made into text, and are output by displaying superimposed on a content, on a display screen of the television apparatus 30A.

Further, as shown on the right display screen 180b of FIG. 4, emotion expression data such as "ahaha!", "hahaha" and "hee-hee" representing an emotion of "laughter" are made into text, and are output by displaying superimposed on a content, on a display screen of the television apparatus 30A. Note that, in the example shown on the right of FIG. 4, it is decided that there is a high proportion of "laughter" based on a statistical result, by the determination unit 17, and emotion expression data is output by a plurality of types of expression methods.

In this way, reactions of other viewing users in remote locations are provided by an expression method representing emotions estimated based on the reactions of the viewing users, without the raw voice of a viewing user or converting the raw voice into text as it is.

Figure 5:
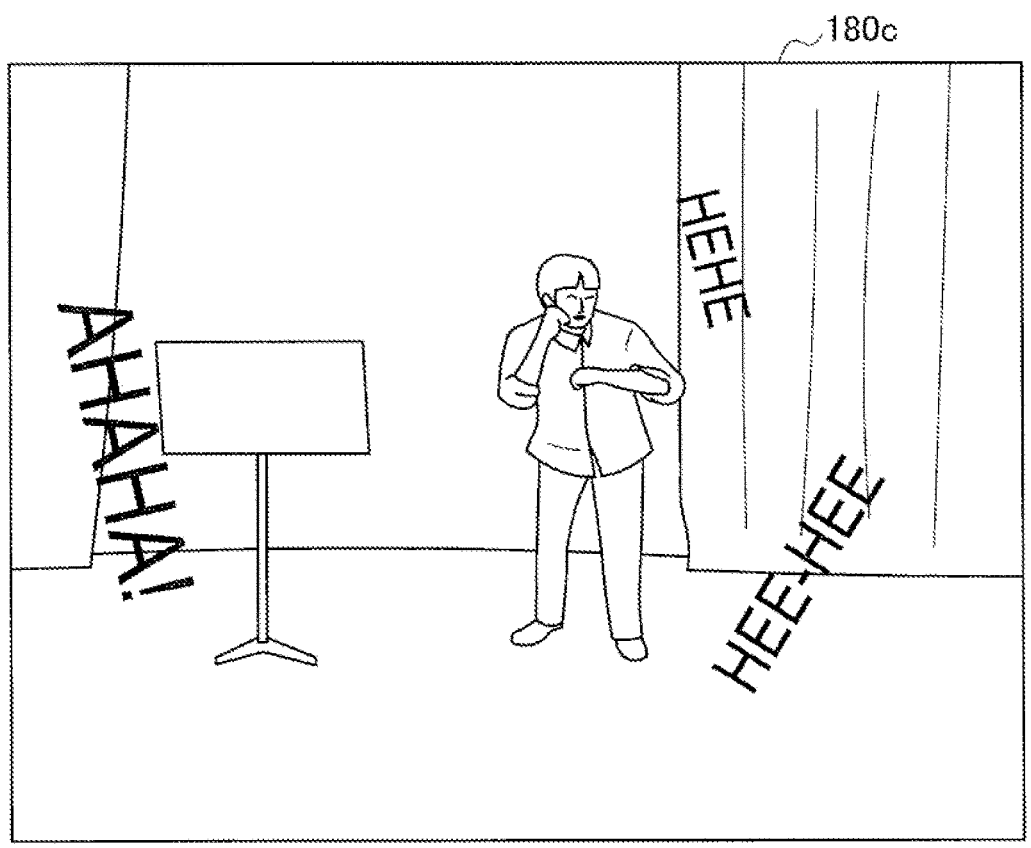
FIG. 5 is a figure which shows an output example in which emotion expression data (nonverbal reactions) formed by text data are displayed superimposed on a content by an expression method such as a comic.

Note that, the characters of text data are not particularly limited, and it may be an expression method, for example, such as a comic. Here, an output example is shown in FIG. 5 in which emotion expression data (nonverbal reactions) formed by text data are displayed superimposed on a content by an expression method such as a comic. As shown on the display screen 180c of FIG. 5, emotion expression data (nonverbal reactions) representing an emotion of "laughter" are presented by an expression method such as a comic. Further, in the case where an expression method such as a comic is used, it is possible for the determination unit 17 to perform a determination for emotion expression data, for example, which is formed by an effect line (drawing data) of a comic.

Further, the output examples of emotion expression data according to the present embodiment are not limited to the examples shown in FIG. 4 and FIG. 5. For example, the output control unit 18 may project emotion expression data by text data or drawing data onto a wall of the surroundings of the television apparatus 30, in coordination with an external apparatus such as a projector (an example of an information presentation apparatus). In this way, it can avoid a part of a content from disappearing by displaying emotion expression data superimposed on the content. Here, an output example will be shown in FIG. 6 in which emotion expression data (nonverbal reactions) formed by text data are projected by a projector.

Figure 6:
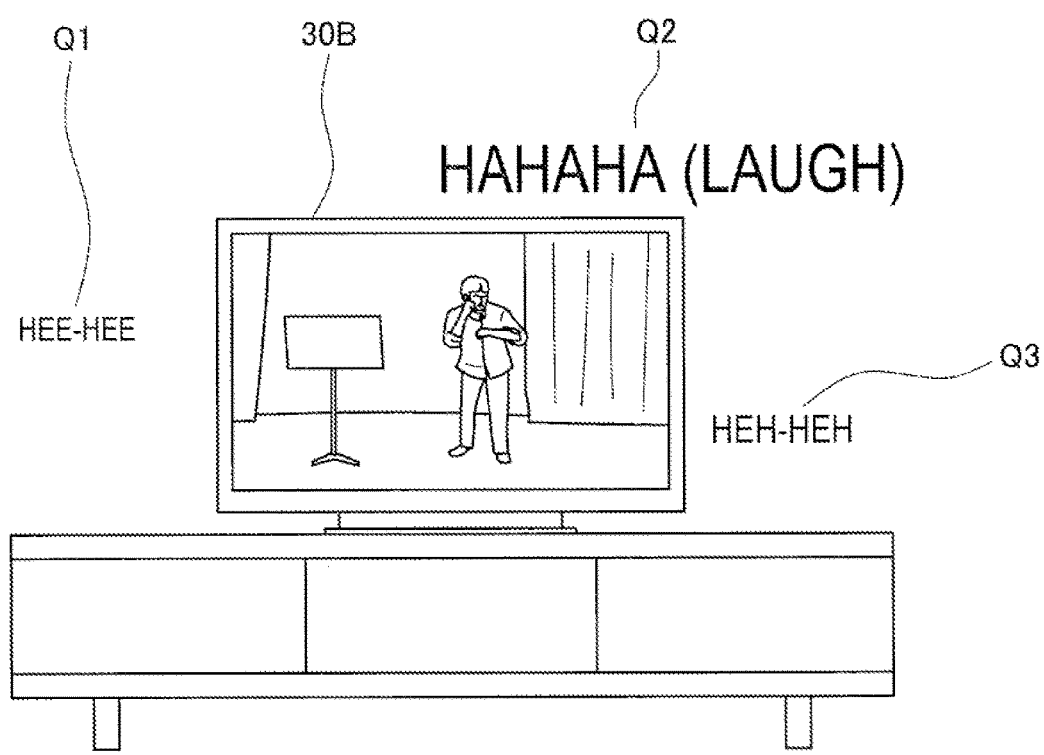
FIG. 6 is a figure which shows an output example in which emotion expression data (nonverbal reactions) formed by text data are projected by a projector.

The output control unit 18 sends emotion expression data Q1 to Q3 formed by text data in a projector (not illustrated), and projects it onto a wall of the surroundings of the television apparatus 30B, such as shown in FIG. 6. The emotion expression data Q1 to Q3 are, for example, a plurality of text data for expressing an emotion of "laughter".

In addition, the output control unit 18 may output emotion expression data by causing a vibration built into a sofa on which the viewing user 3B is sitting, or headphones, to vibrate.

Further, in the case where emotion estimation results of each viewing user are acquired from the server 2-1, the output control unit 18 may determine emotion expression data based on each emotion estimation result, and may output each emotion expression data along with a face image or avatar image respectively showing whose emotion expression data.

Further, in the case where nonverbal reactions are output by audio data, while the output control unit 18 may perform output from a speaker included in the television apparatus 30B, there will be a lack of a sense of presence even if only hearing voices of other viewing users not present in front. Accordingly, the output control unit 18 according to the present embodiment may locate sound images beside or in front of the viewing user 3B by using, for example, surround speakers, virtual sound technology or the like, and may replicate a condition so as if other viewing users are in the surroundings. Hereinafter, a specific description will be made by referring to FIG. 7.

Figure 7:
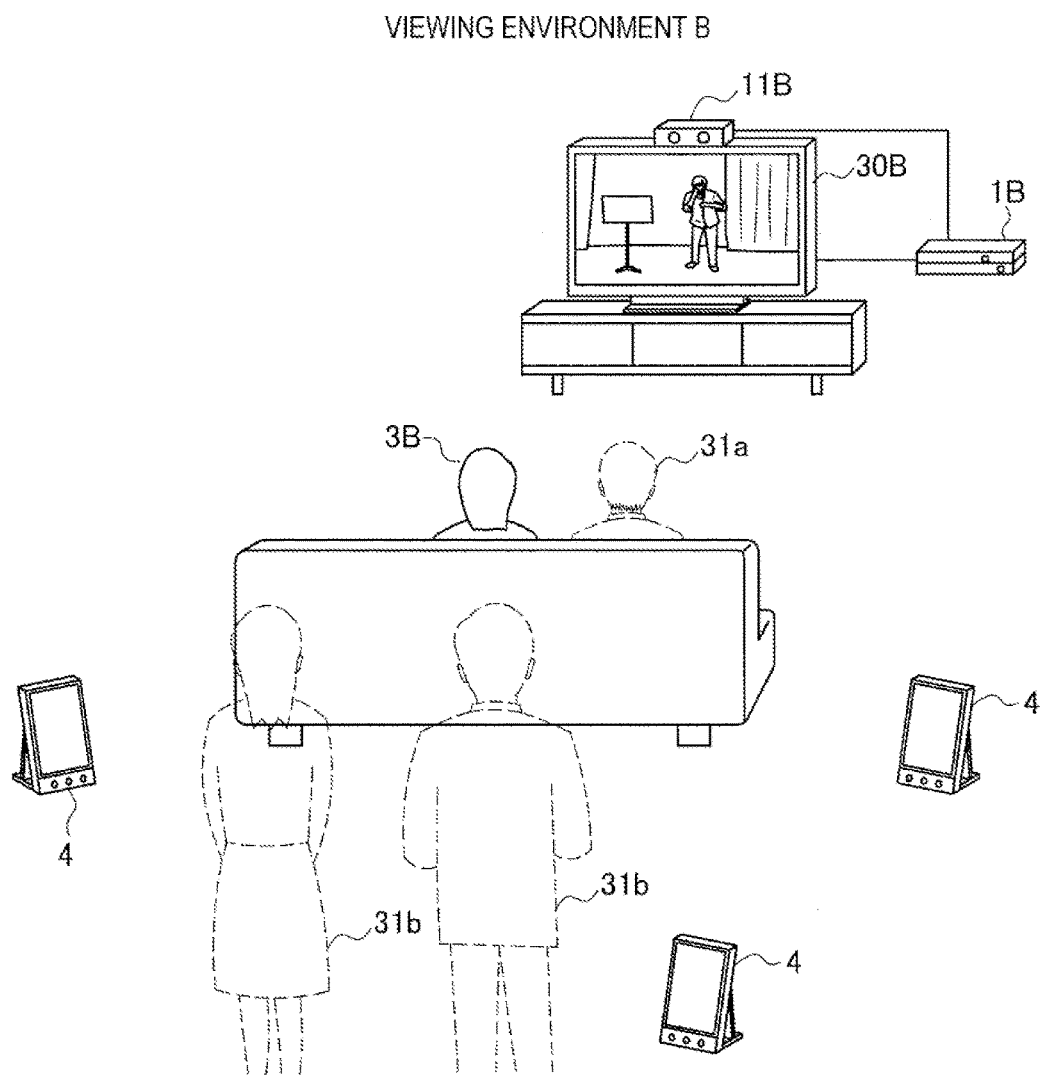
FIG. 7 is a figure for describing an output example of emotion expression data (nonverbal reactions) formed by audio data.

FIG. 7 is a figure for describing an output example of emotion expression data (nonverbal reactions) formed by audio data. As shown in FIG. 7, a plurality of speakers 4 (an example of an information presentation apparatus) are arranged in the viewing environment B, and a surround speaker system is implemented. The plurality of speakers 4 may be constituted by a speaker array. The output control unit 18 of the client apparatus 1B outputs emotion expression data formed by audio data, by using a speaker (front speaker) built into the television apparatus 30B, and the speakers 4 arranged in the surroundings of the viewing user 3B. Here, the output control unit 18 performs a sound image location control so as if other viewing users 31a and 31b are actually beside or behind the viewing user 3B, replicates a sense of presence, and provides a stronger empathy experience. At this time, the output control unit 18 may locate a sound image of emotion expression data corresponding to a specific other viewing user who is acquainted with the viewing user 3B beside the viewing user 3B (the position of the viewing user 31a). Further, the output control unit 18 may locate sound images of emotion expression data corresponding to an unspecified large number of other viewing users who are not acquainted with the viewing user 3B behind the viewing user 3B (the position of the viewing users 31b).

Heretofore, a configuration of each apparatus according to the present embodiment has been described. Note that, in FIG. 3 to FIG. 7, while the cases have been described, as examples, in which emotion expression data is presented to the viewing user 3B in the viewing environment B, the same processes are also performed in the viewing environment A, and the other viewing environments C and D. In this way, each of the viewing users 3A to 3D in remote locations can obtain an empathy experience by sharing emotions while mutually viewing a same content.

Further, the internal configuration of each apparatus shown in FIG. 3 is an example, and the configuration according to the present embodiment is not limited to the example shown in FIG. 3. For example, the processes of the "emotion estimation unit 13" included in the client apparatus 1A-1, and the processes of the "determination unit 17" included in the client apparatus 1B-1, may be executed by the server 2-1.

Further, in the above described embodiment, while the server 2-1 collects emotion estimation results based on viewing reactions of the viewing users 3A to 3D in each of the viewing environments A to D who are viewing a same content, the present embodiment is not limited to this. For example, in the case where the content is a sports tournament or a recorded program, the server 2-1 may collect emotion estimation results based on viewing reactions of users in the place where the content is generated. Specifically, the server 2-1 receives information (image data, audio data) detected by various types of sensors (a camera or a microphone) installed in a soccer or baseball stadium, estimates emotions, and includes estimated emotion estimation results in an integration target.

For example, at the time when a soccer match is viewed in each of the viewing environments, the server 2-1 respectively estimates emotions of supporters of the team which each of the viewing users 3 are supporting based on reactions of the supporters acquired from supporter seats of the soccer stadium, and transmits an estimation result to each of the viewing environments. Also, for example, in the viewing environment B, the client apparatus 1B-1 can present emotion expression data representing the emotions of supporters of the team which the viewing user 3B is supporting.

In this way, for example, in the case where the team which the viewing user 3B is supporting is superior, emotion expression data representing emotions of "surprise" and "delight" by the supporters of this team are presented, without vocal support of the supporters of both sides being presented as it is. Further, in the case where this team is inferior, emotion expression data representing emotions of "disappointment" and "sadness" by the supporters of this team are presented. In this way, the viewing user 3 can implement an empathy experience with supporters of the team being supported. Note that, which team the viewing user is supporting may be decided based on profile information of the user, by each of the client apparatuses 1 or the server 2-1, and may be able to be specifically selected by the user prior to watching a match.

Figure 8:
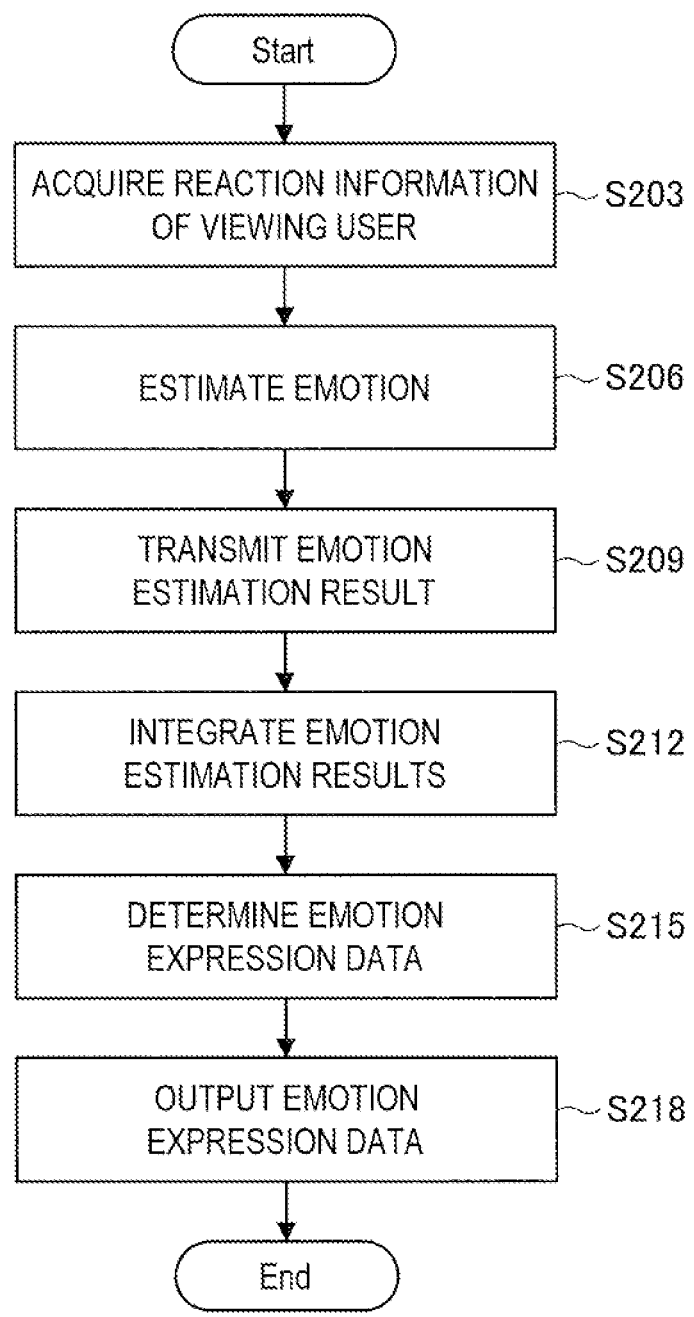
FIG. 8 is a flow chart which shows the operation processes of the viewing reaction feedback system according to the present embodiment.

To continue, the operation processes of the viewing reaction feedback system according to the present embodiment will be specifically described by referring to FIG. 8.

2-1-2. Operation Processes

FIG. 8 is a flow chart which shows the operation processes of the viewing reaction feedback system according to the present embodiment. As shown in FIG. 8, first, in step S203, the reaction information acquisition unit 12 of the client apparatus 1A-1 acquires reaction information of the viewing user 3A from the sensor 11A.

Next, in step S206, the emotion estimation unit 13 estimates an emotion of the viewing user 3A, based on the reaction information of the viewing user acquired by the reaction information acquisition unit 12.

Next, in step S209, the transmission unit 15 transmits an emotion estimation result of the viewing user 3A estimated by the emotion estimation unit 13 via a network to the server 2-1.

Next, in step S212, the integration unit 23 of the server 2-1 integrates emotion estimation results of a plurality of viewing users received from each of the viewing environments by the reception unit 21. An integration result is transmitted to the client terminal 1B-1 via a network from the transmission unit 25.

Next, in step S215, the determination unit 17 of the client apparatus 1B-1 determines emotion expression data, based on the integration result (statistical data of the plurality of emotion estimation results) received from the server 2-1 by the reception unit 16. The emotion expression data may be represented by nonverbal reactions such as onomatopoeic words, mimetic words and exclamations, such as described above. Further, the emotion expression data may be formed by text data, audio data, drawing data or the like, such as described above.

Then, in step S218, the output control unit 18 of the client apparatus 1B-1 performs a control so as to output the emotion expression data determined by the determination unit 17 from each of the information presentation apparatuses (for example, the television apparatus 30B, the speaker 4) arranged in the viewing environment B.

The above described processes are continuously and repeatedly performed, while a content is being viewed.

As described above, according to the viewing reaction feedback system according to a first embodiment, a viewing user can share emotions with a plurality of users, and can obtain an empathy experience, by having emotion expression data showing emotions of the viewing reactions of other viewing users presented to the viewing user. Further, since a video or audio of other viewing users is not presented as it is, and a family conversation or the like which is not related to the viewing reactions is not overheard as it is, the privacy of each viewing user is secured, and an obstruction of the viewing of a user is also avoided.

2-2. Second Embodiment

In the above described first embodiment, since reactions of each viewing user are presented by replacing with emotion expression data, viewing of a content is not obstructed, and the privacy of each of an unspecified large number of viewing users is also secured. However, in the case where using the viewing reaction feedback system according to the present embodiment by specific users who are acquainted, the privacy of a viewing user will not particularly be a problem, even if presenting raw audio of the viewing user to other viewing users.

Accordingly, in the viewing reaction feedback system according to a second embodiment, in the case where emotion expression data can be extracted from the speech of a viewing user, this emotion expression data is presented to specific other users (users permitted by the viewing user, friends or acquaintances who are acquainted with the viewing user). Hereinafter, a specific description will be made by referring to FIG. 9.

2-2-1. Configuration

Figure 9:
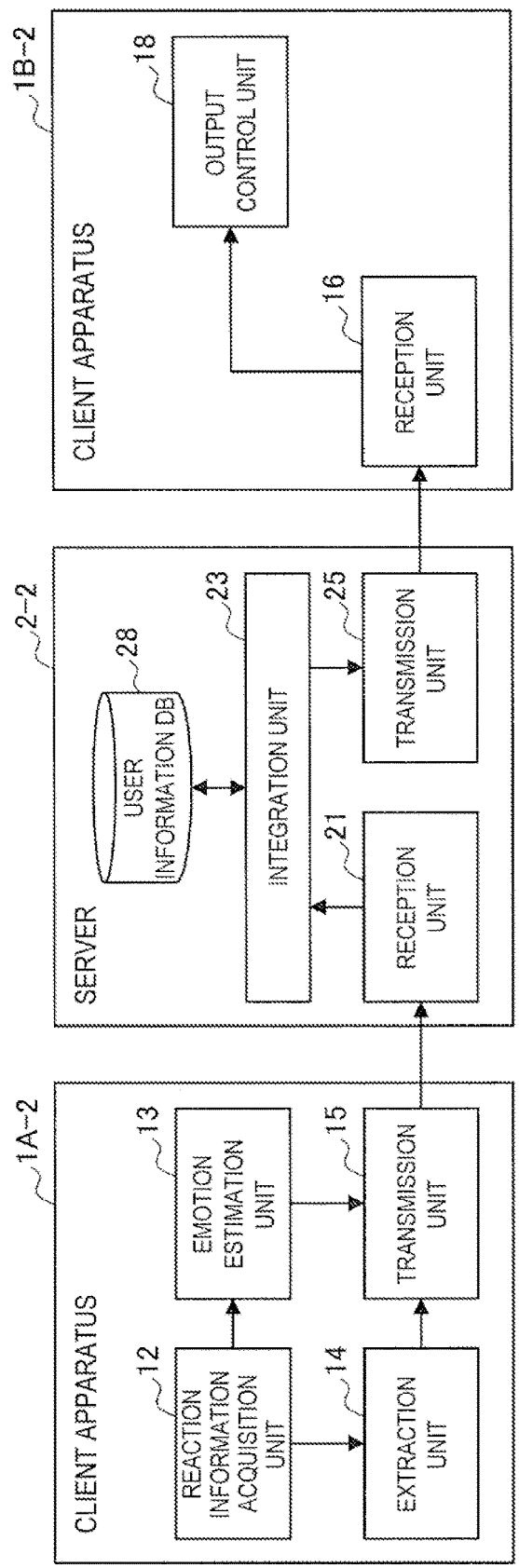
FIG. 9 is a block diagram which shows an example of an internal configuration of each apparatus which forms the viewing reaction feedback system according to a second embodiment.

FIG. 9 is a block diagram which shows an example of an internal configuration of each apparatus which forms the viewing reaction feedback system according to the second embodiment. As shown in FIG. 9, the viewing reaction feedback system according to the present embodiment has a plurality of client apparatuses 1A-2 and 1B-2, and a server 2-2.

Client Apparatus 1A-2

The client apparatus 1A-2 is an apparatus which controls the viewing environment A shown in FIG. 1, and specifically, such as shown in FIG. 9, has a reaction information acquisition unit 12, an emotion estimation unit 13, an extraction unit 14 and a transmission unit 15.

The reaction information acquisition unit 12 and the emotion estimation unit 13 have functions the same as those of the first embodiment described with reference to FIG. 3, and an emotion is estimated, based on reaction information (imaging image, audio data) of the viewing user 3A acquired by the reaction information acquisition unit 12.

The extraction unit 14 extracts emotion expression data from the reaction information of the viewing user 3A acquired by the reaction information acquisition unit 12. For example, at the time of liveliness such as a goal scene of soccer, in the case where audio data collected by the speech of the viewing user 3A, such as "what a goal! now the score is even!", is acquired by the reaction information acquisition unit 12, the extraction unit 14 performs audio recognition for the audio data, and analyses the speech details as character data. Also, the extraction unit 14 searches for character data which corresponds to emotion expression data expressing an emotion, from the analyzed character data. For example, a word (exclamation) representing an emotion of "wonder" such as "awesome" can be discovered from the above described speech. The extraction unit 14 extracts (pulls out) audio data (raw audio as it is) of the user 3A of the discovered word portion (section portion) as emotion expression data by audio, and outputs it to the transmission unit 15.

The transmission unit 15 transmits an emotion estimation result of the viewing user 3A estimated by the emotion estimation unit 13, and emotion expression data by audio of the viewing user 3A extracted by the extraction unit 14, to the server 2-2 via a network.

Server 2-2

As shown in FIG. 9, the server 2-2 has a reception unit 21, an integration unit 23, a transmission unit 25 and a user information DB (database) 28. The functions of the reception unit 21, the integration unit 23 and the transmission unit 25 are the same as those of the first embodiment described with reference to FIG. 3. Data such as which viewing users become specific viewing users (other viewing users who are acquainted such as a friend or acquaintance), or become an unspecified large number of viewing users (other viewing users who are not acquainted), is stored in the user information DB 28. Specifically, for example, a same group ID is associated with specific viewing users who are mutually acquainted (note that, in the case where there are a plurality of combinations of specific viewing users who are acquainted, a different group ID is used for each combination). Therefore, other viewing users associated by a same group ID are specific other viewing users who are acquainted, and other viewing users not associated by a same group ID are non-specific other viewing users who are not acquainted. The server 2-2 according to the present embodiment transmits emotion expression data by audio of the viewing user 3A, along with an integration result by the integration unit 23, to specific other viewing users (for example, the viewing user 3B) who are acquainted with the viewing user 3A. On the other hand, the server 2-2 transmits only an integration result by the integration unit 23 to an unspecified large number of other viewing users (for example, the viewing users 3C and 3D) who are not acquainted with the viewing user 3A.

Client Apparatus 1B-2

The client apparatus 1B-2 is an apparatus which controls the viewing environment B shown in FIG. 1, and specifically, such as shown in FIG. 9, has a reception unit 16 and an output control unit 18. Here, the viewing environment B is assumed to be an environment in which the viewing user 3B is present who is a specific other viewing user, such as a friend or acquaintance, acquainted with the viewing user 3A. Which viewing users become specific viewing users, or become an unspecified large number of viewing users, is managed by the server 2-2 side, such as described above. The client apparatus 1B-2 which controls the viewing environment B performs a control so as to output emotion expression data by audio of the viewing user 3A, received from the server 2-2 by the reception unit 16, from an information presentation apparatus (for example, the television apparatus 30B) by the output control unit 18.

In this way, since the privacy of a viewing user does not become a problem for specific other viewing users who are acquainted with the viewing user, emotion expression data is presented by audio of the viewing user. Note that, emotion expression data determined based on an integration result of emotion estimation results of each viewing user is presented, to an unspecified large number of other viewing users who are not acquainted with the viewing user, similar to that of the first embodiment, by a client apparatus which has a configuration the same as that of the client apparatus 1B-1 according to the first embodiment.

2-2-2. Modified Example

Here, there will be cases where it is thought that familiar users will want to transfer direct comments, by a scene of a content being viewed, for example, a lively setting such as a goal scene or a foul scene of soccer. Accordingly, as a modified example of the second embodiment, in the case where liveliness (a specific empathy scene) has been detected, direct communication is temporarily made possible. Note that, by only having direct communication temporarily performed at the time when liveliness (a specific empathy scene) has been detected, convenience can be improved without obstructing the viewing of a user. Hereinafter, a specific description will be made by referring to FIG. 10.

Figure 10:
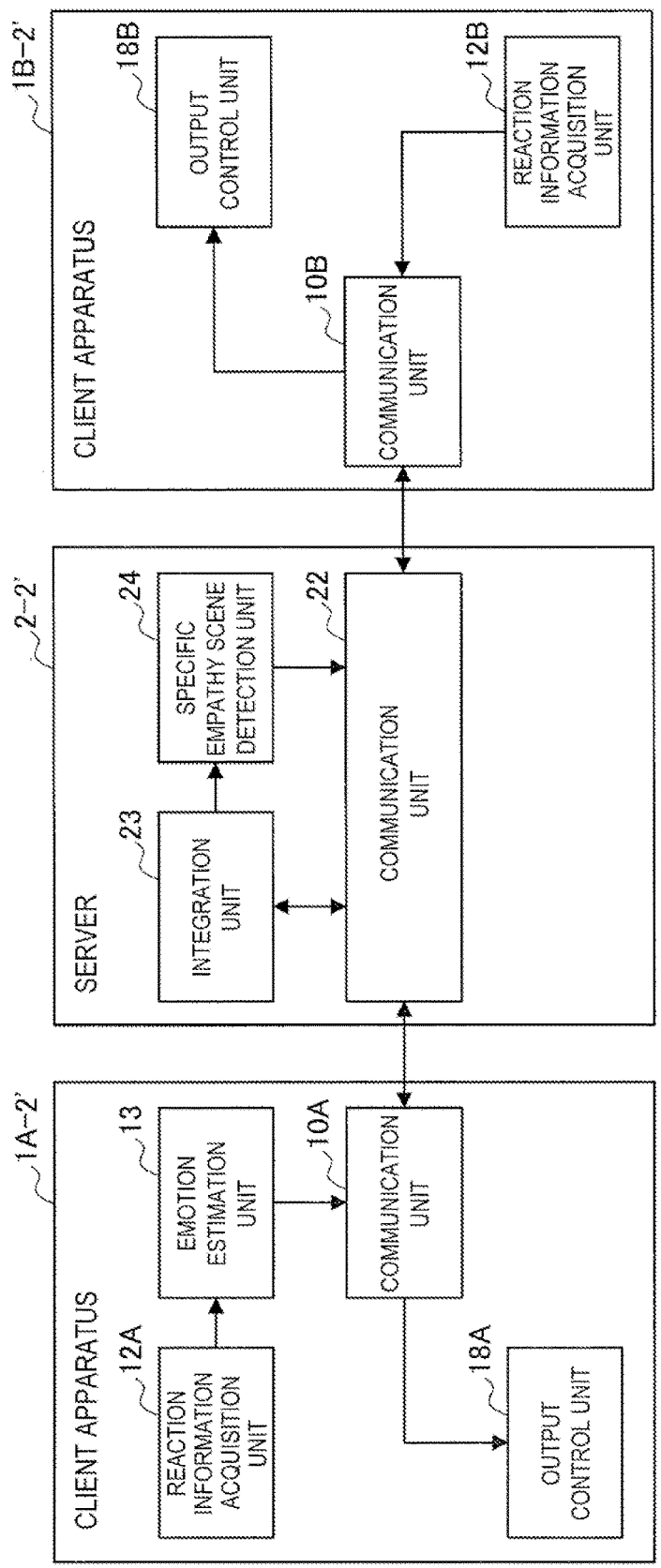
FIG. 10 is a block diagram which shows an example of an internal configuration of each apparatus which forms the viewing reaction feedback system according to a modified example of the second embodiment.

FIG. 10 is a block diagram which shows an example of an internal configuration of each apparatus which forms the viewing reaction feedback system according to a modified example of the second embodiment. As shown in FIG. 10, the viewing reaction feedback system according to the present embodiment has a plurality of client apparatuses 1A-2' and 1B-2', and a server 2-2'.

Client Apparatus 1A-2'

The client apparatus 1A-2' is an apparatus which controls the viewing environment A shown in FIG. 1, and specifically, such as shown in FIG. 10, has a reaction information acquisition unit 12A, an emotion estimation unit 13, a communication unit 10A and an output control unit 18A. The reaction information acquisition unit 12A and the emotion estimation unit 13 have functions the same as those of the first embodiment described with reference to FIG. 3.

The communication unit 10A has the function of the transmission unit 15 according to the first embodiment described with reference to FIG. 3, and the function of a reception unit which receives a detection notification of a specific empathy scene, audio data of specific other viewing users 3 or the like from the server 2-2'.

The output control unit 18A performs a control so as to output data received by the communication unit 10A from an information presentation apparatus (the television apparatus 30A or the speaker) arranged in the viewing environment A.

Server 2-2'

As shown in FIG. 10, the server 2-2' has a communication unit 22, an integration unit 23 and a specific empathy scene detection unit 24.

The communication unit 22 has the function of the reception unit 21 and the function of the transmission unit 25 according to the first embodiment described with reference to FIG. 3.

The integration unit 23 is the same as that of the first embodiment described with reference to FIG. 3. Further, the integration unit 23 outputs an integration result to the specific empathy scene detection unit 24.

The specific empathy scene detection unit 24 detects a specific scene (hereinafter, also called a specific empathy scene) which has liveliness such as a goal scene of soccer, for example, based on an integration result by the integration unit 23, and a scene analysis result of a content. A scene analysis of a content may be performed by the specific empathy scene detection unit 24.

Specifically, for example, in the case where a score of an emotion surpasses a prescribed value, based on an integration result by the integration unit 23, the specific empathy scene detection unit 24 performs detection as a specific empathy scene. Further, for example, in the case where there is a scramble for the ball near a goal if it is soccer, or in the case where a runner is going towards home base if it is baseball, based on a scene analysis, the specific empathy scene detection unit 24 performs detection as a specific empathy scene.

In the case where a specific empathy scene is detected, the specific empathy scene detection unit 24 notifies that a specific empathy scene is detected to each of the client apparatuses 1 via the communication unit 22. By detecting a specific empathy scene, for example, this notification is displayed as text on the television apparatus 30, or is output as audio from the speaker.

Also, the server 2-2' causes direct communication between specific familiar users to be started. Here, between which viewing environments direct communication is to be started may be automatically decided by the server 2-2' based on profile information of the users or the like, or for which viewing users direct communication is to be started may be selected by the viewing users at the time of notification.

Client Apparatus 1B-2'

The client apparatus 1B-2' is an apparatus which controls the viewing environment B shown in FIG. 1, and specifically, such as shown in FIG. 10, has a reaction information acquisition unit 12B, a communication unit 10B and an output control unit 18B.

The reaction information acquisition unit 12B acquires reaction information (imaging image, audio data) of the viewing user 3B from a sensor 11B (not illustrated), similar to the reaction information acquisition unit 12A of the client apparatus 1A-2'.

The communication unit 10B has the function of the reception unit 16 according to the first embodiment described with reference to FIG. 3, and a function of a transmission unit which transmits reaction information of the viewing user 3B acquired by the reaction information acquisition unit 12B to the server 2-2'.

The output control unit 18B is the same as the output control unit 18 according to the first embodiment described with reference to FIG. 3. Further, the output control unit 18B according to the present embodiment presents a detection notification of a specific empathy scene received from the server 2-2' to the viewing user B.

By the above described configuration, when a specific empathy scene is detected by the server 2-2', a detection notification is notified to the client apparatuses 1A-2' and 1B-2', and direct communication between the client apparatuses 1A-2' and 1B-2' is started.

Direct communication is, for example, audio data or an imaging image of the viewing user 3B acquired by each of the reaction information acquisition units 12B being transmitted to a specific familiar other viewing user 3A as it is, and audio data or an imaging image from the viewing user 3A also being transmitted to the viewing user 3B. Whether direct communication is performed by only audio data, or whether an imaging image is also sent, can be determined by a setting of a user.

Heretofore, a specific description has been made for the case where direct communication is temporarily performed in the case where a specific empathy scene has been detected. Note that, other than a specific empathy scene, emotions of each viewing user are presented to other viewing users by converting into emotion expression data such as nonverbal reactions. In this way, since conversations and video other than that which may be necessary are not sent to other users, a protection of privacy is maintained.

Further, while the timing at which direct communication is temporarily started and afterwards direct communication is ended can be variously considered, for example, the client apparatuses 1A-2' and 1B-2' or the server 2-2' may end in the case when fixed time communication is not detected, or may end in accordance with a specific end instruction operation by the viewing user. The specific end instruction operation is an operation using a remote controller connected with the television apparatus 30, a gesture by the viewing user, audio, a sight line or the like. In the case where these specific end instruction operations by the viewing user have been detected, the client apparatuses 1A-2' and 1B-2' end transmission of audio or video of the viewing user.

Further, the viewing reaction feedback system according to a modified example of the present embodiment may temporarily start direct communication, in accordance with a specific instruction by the viewing user such as wanting to temporarily perform direct communication, even in the case where a specific empathy scene has not been detected. The specific instruction can be performed for the client apparatus 1, for example, by using a specific operation (pressing a button or the like) in a remote controller, a specific operation in a GUI of an information processing terminal such as a smart phone, a specific gesture, audio recognition, sight line detection or the like. The client apparatus 1 receiving such an instruction notifies the start of direct communication to the server 2-2', and to the client apparatus of the viewing environment in which there is a familiar specific other viewing user.

Note that, there will be cases where direct communication by a video or audio of other viewing users, which is not converted into emotion expression data such as nonverbal reactions, is wanted to be refused by a user wanting to concentrate on a content. In this case, it is possible to set a refusal at the client apparatus 1 side, so as to not receive a detection notification of a specific empathy scene or direct communication.

2-3. Third Embodiment

As described above, by presenting emotion expression data, based on an integration result of emotion estimation results of each viewing user, to a plurality of viewing environments connected to the server 2 via a network, it becomes possible for each of the viewing users to further strengthen empathy. Such a system which strengthens empathy of viewing users by the presentation of emotion expression data can also be applied to the case where there is one viewing environment. In the case where there is only one viewing environment, while an integration result of emotion estimation results of other viewing users is not able to be used, emotions felt by a user can be strengthened and amplified, by determining emotion expression data by nonverbal reactions or the like, based on an emotion estimation result of a user instruction, and presenting it to the user himself or herself. The application of such a system according to the present disclosure by a single viewing environment will hereinafter be called an emotion amplifier. Hereinafter, an emotion amplifier according to the present embodiment will be specifically described by referring to FIG. 11.

Figure 11:
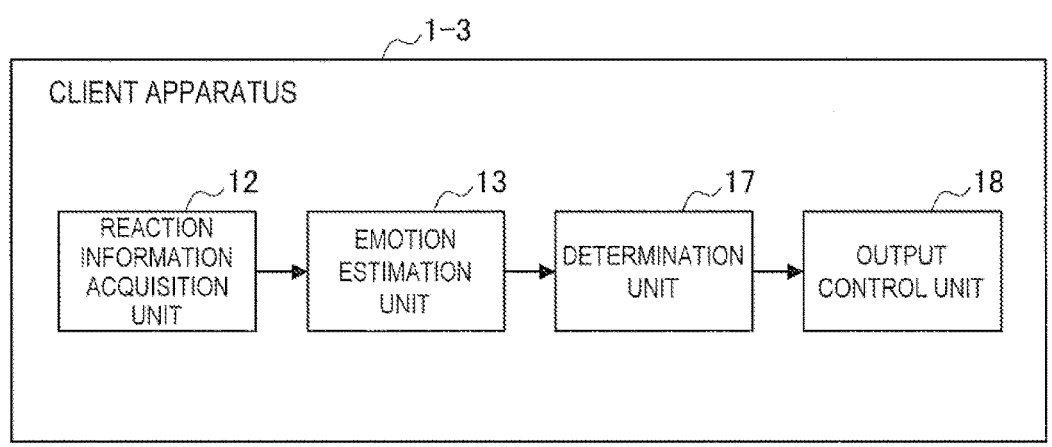
FIG. 11 is a block diagram which shows an example of an internal configuration of a client apparatus according to a third embodiment.

FIG. 11 is a block diagram which shows an example of an internal configuration of a client apparatus 1-3 according to a third embodiment. As shown in FIG. 11, the client apparatus 1-3 according to the present embodiment has a reaction information acquisition unit 12, an emotion estimation unit 13, a determination unit 17 and an output control unit 18.

Each of these configurations are the same as each of the configurations of the first embodiment described with reference to FIG. 3.

Specifically, first, reaction information of a viewing user is acquired by the reaction information acquisition unit 12. For example, a video (triumphant pose or the like) of a lively viewing user watching a good play of soccer is acquired.

Next, the emotion estimation unit 13 estimates an emotion of the viewing user, based on the reaction information acquired by the reaction information acquisition unit 12. For example, the emotion estimation unit 13 estimates an emotion of "delight", based on a video of a triumphant pose.

Next, the determination unit 17 determines emotion expression data representing the estimated emotion. For example, in the case of an emotion of "delight", emotion expression data formed by audio or text such as "hooray!" or "yay" is determined.

Then, the output control unit 18 outputs the emotion expression data determined by the determination unit 17 from an information presentation apparatus (the television apparatus 30 or the speaker), and causes the liveliness of the viewing user to be amplified.

In this way, emotion expression data determined based on an emotion of the viewing user himself or herself can be presented to the viewing user, even in a single viewing environment, the emotion of the viewing user can be amplified, and the viewing user can be livelier, cry more, or laugh more.

While the above described emotion amplifier according to the third embodiment is used in a single viewing environment, the emotion amplifier according to the present disclosure is not limited to a single viewing environment, and may be used at the same time in the plurality of viewing environments connected by a network described above in the first and second embodiments.

In this way, in the case where only a viewing user is lively, for example, such as the instant when a minor but favorite artist of himself or herself has been registered or for a good play of soccer only known by mania, cheering where there is no actual content or the like is output, in accordance with the liveliness of the viewing user, and a liveliness appropriate for each user is produced.

Further, at the time when viewing a content of real time such as a soccer match, there will be cases where a delay occurs between a timing at which it is lively by a goal scene of soccer and a timing at which emotion expression data is presented based on (an integration result of) emotion estimation results of other viewing users. In this case, by using in combination with the above described emotion amplifier according to the third embodiment, emotion expression data determined based on emotions of the viewing user himself or herself can be immediately presented, and by presenting emotion expression data of other viewing users afterwards, real time liveliness can be produced by cancelling a delay.

Further, in the viewing reaction feedback system according to the present embodiment, emotion expression data representing emotions of specific other viewing users who are familiar with a viewing user may be presented (output), and afterwards, emotion expression data representing emotions of an unspecified large number of other viewing users may be presented (output). In this way, reactions of specific other viewing users such as familiar friends can be known first, and liveliness between familiar friends can be enjoyed with empathy. Specifically, for example, the output control unit 18 may end an output of emotion expression data (hereinafter, also called first emotion expression data) representing emotions of specific other viewing users, and afterwards may start an output of emotion expression data (hereinafter, also called second emotion expression data) representing emotions of an unspecified large number of other viewing users. Further, the output control unit 18 may cause an output of the second emotion expression data to fade in (cross fade) while causing an output of the first emotion expression data to fade out. Further, at the time when starting an output of the second emotion expression data, the output control unit 18 may cause an output of the first emotion expression data to continue by lowering an output value (the volume, the size of display text or the like) of the first emotion expression data more than an output value of the second emotion expression data.

2-4. Fourth Embodiment

In the above described first to third embodiments, while emotion expression data is presented between viewing users viewing a content in real time, and empathy of each of the viewing users is strengthened, the viewing reaction feedback system according to the present disclosure is not limited to this. For example, by tagging (hereinafter, also called an emotion tag) an emotion estimation result of each viewing user or an integration result with this scene of a content, it is possible to detect and recommend a content by using this emotion tag afterwards, and to perform a presentation of emotion expression data.

Usually, at the time when providing chapters within a content in a recording device or the like, the chapters are set on the basis of information such as a "CM", "post meta (scene difference, actor difference or the like)" or "volume level within a content". However, since reactions of actual viewing users are not reflected, it will be difficult to detect a scene for which it is lively by the general public, at the time when viewing a content, even if it is thought to be "a scene for which it is lively by the general public that is wanted to be watched by himself or herself".

Accordingly, in the present embodiment, by adding an emotion tag to a scene of a content based on an emotion estimation result of an actual viewing user, a scene wanted to be watched can be selected by using emotion estimation results of actual other viewing users. Further, by using emotion estimation results of actual other viewing users for a recommendation of a content, a recommendation with a high accuracy can be performed for a viewing user. Hereinafter, a specific description will be made by referring to FIG. 12.

FIG. 12 is a block diagram which shows an example of an internal configuration of each apparatus which forms the viewing reaction feedback system according to a fourth embodiment. As shown in FIG. 12, the viewing reaction feedback system according to the present embodiment has a plurality of client apparatuses 1A-4 and 1B-4, and a server 2-4.

Client Apparatus 1A-4

The client apparatus 1A-4 is an apparatus which controls the viewing environment A shown in FIG. 1, and specifically, such as shown in FIG. 12, has a reaction information acquisition unit 12A, an emotion estimation unit 13A, a communication unit 10A and a content processing unit 19A. The reaction information acquisition unit 12A, the emotion estimation unit 13A and the communication unit 10A are the same as those of the second embodiment described with reference to FIG. 10.

The content processing unit 19A performs a reproduction control of a content corresponding to a user operation, scene detection of a content based on an emotion tag or the like.

Further, the content processing unit 19 may transmit information (CH information, program information, time information or the like) of a content viewed by a user to the server 2-4 via the communication unit 10A.

Client Apparatus 1B-4

The client apparatus 1B-4 is an apparatus which controls the viewing environment B shown in FIG. 1, and specifically, such as shown in FIG. 12, has a reaction information acquisition unit 12B, an emotion estimation unit 13B, a communication unit 10B and a content processing unit 19B. The reaction information acquisition unit 12B and the communication unit 10B are the same as those according to the second embodiment described with reference to FIG. 10.

Further, the emotion estimation unit 13B has a function the same as that of the emotion estimation unit 13 according to the second embodiment described with reference to FIG. 10.

The content processing unit 19B has a function the same as that of the above described content processing unit 19A.

Server 2-4

As shown in FIG. 12, the server 2-4 has a reception unit 21, an association unit 26, an emotion tag generation unit 27 and a transmission unit 25.

The reception unit 21 receives emotion estimation results from a plurality of client apparatuses 1 which includes the client apparatus 1A-4.

The association unit 26 performs mapping (integration) of emotion estimation results of each viewing user received by the reception unit 21, with a content. Specifically, the association unit 26 associates each of the emotion estimation results, in a time series for a content. At this time, the association unit 26 may associate an integration result integrating a plurality of emotion estimation results to a corresponding scene (chapter) of the content.

The emotion tag generation unit 27 generates information, which shows what emotion has been associated with which scene of a content, as an emotion tag, based on emotion estimation results (or an integration result) associated by the association unit 26, and transmits it to each of the client apparatuses 1A-4 and 1B-4 via the transmission unit 25.

By the above described configuration, the content processing units 19A and 19B (hereinafter, also called the content processing unit 19) of each of the client apparatuses 1A-4 and 1B-4 can perform a scene detection of a content based on an emotion tag received from the communication unit 10, at the time of content reproduction.

For example, at the time when some program X has been viewed by each user, in the server 2-4, an emotion tag is generated which shows whether the plurality of users were lively, laughing, frustrated or the like, and transmits it to the client apparatus 1.

Then, at the time when a user views a content afterwards, the client apparatus 1 performs a scene detection and recommendation of the content, by using an emotion tag which shows whether other actual users were lively or the like.

In this way, it is possible for a user who is attempting to view a content to detect a scene for which it was actually lively by the general public or a specific community.

Further, it is possible for a user who is attempting to view a content to detect a content suitable for a feeling (emotion) of himself or herself at present. For example, at the time when it is thought that the user wants to laugh, it is possible to detect a comedy program (content) which is not able to be estimated from the title, other than a comedy program capable of being estimated from the title.

Further, it is possible for the client apparatus 1 to recommend a content more suited to the desire of a viewing user, by using the number of other viewing users used for emotion tag generation, or the score of an emotion estimation result.

Further, at the time when some recorded program is time shift reproduced, it is possible for the client apparatus 1 to perform scene reproduction such as reproducing only a lively scene or an interesting scene, by using an emotion tag.

Note that, other than a program being broadcast, a program recorded in a recording device, a VOD content, an Internet video content or the like are also included as a target content according to the present embodiment.

Further, the client apparatus 1 may express an emotion tag by an icon, a color or the like, on a reproduction process bar.

Note that, in the present embodiment, while the range of viewing users to be targeted in the association unit 26 of the server 2-4 is not particularly limited, the range of viewing users to be targeted may be everyone (an unspecified large number), or may be only specific communities or friends (other specific users) corresponding to a setting of a viewing user.

3. Summary

As described above, the present embodiment can feedback emotion expression data showing viewing reactions of other viewing users or a viewing user himself or herself, and can cause empathy to be strengthened, by a method which can protect the privacy of the viewing user, without obstructing the viewing of the viewing user.

Further, in the case of visual communication of the related art, camera video and microphone audio of himself or herself are presented as they are to a conversation companion, and so there is a problem from the viewpoint of privacy in which a generated reaction (a word, facial expression, movement or the like), which is not illustrated, is transferred to the companion as it is. Further, there is a problem of obstructing content viewing due to the raw reactions of a companion, even if at the conversation companion side which receives a reaction. However, according to the present embodiment, since reactions of the viewing user are presented by converting into emotion expression data (for example, nonverbal reactions) representing emotions, privacy is secured and content viewing is not obstructed, and it becomes possible to have an experience which empathizes a content with other people.

Further, in the case of content viewing of the related art, the content manufacturer side performs a production of an emotion (laughter, wonder, regret or the like), liveliness or the like (for example, inserting laughing voices of an audience into a comedy program or the like). However, according to the present embodiment, since emotion expression data is presented, by actual other viewing users, within specific communities (specific other users who are acquainted or the like), or by emotions or liveliness of a person himself or herself, it becomes possible to have a more real empathy experience.

Further, in the case of a content joint viewing experience using visual communication of the related art, in the case where an emotion expression is generated which is not accompanied by audio, this emotion will not able to be empathized if not turning a line of sight towards a camera video of a companion reflected on the screen, and will become an obstruction of content viewing (for example, at the time when a laughing face without speaking, by watching a comedy program or the like). However, according to the present embodiment, since an emotion which is not accompanied by audio (only a laughing face or the like) is converted into emotion expression data, it becomes possible to implement a richer empathy experience.

Further, in the case where actually performing joint viewing of a content by a plurality of people, the reactions of other people are generated in the surroundings of himself or herself. Accordingly, at the time of remote content joint viewing, there will be a high possibility of an uncomfortable feeling occurring in which nonverbal reactions (audio data) of other people are presented from in front of the user. Accordingly, according to the present embodiment, since nonverbal reactions (audio data) located at sound images are presented surrounding a user, it becomes possible to implement an environment with a sense of unity even at the time of remote content joint viewing.

Further, in the present embodiment, by presenting (projecting) nonverbal reactions onto a surrounding region of the television apparatus 30 by using a projector, an empathy experience can be implemented without obstructing content viewing.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, a computer program for causing hardware such as a CPU, ROM and RAM built into the client apparatus 1 (1A-1 to 1A-4, 1B-1 to 1B-4) and the server 2 (server 2-1 to server 2-4) to exhibit functions of the above described client apparatus 1 and the server 2 can be created. Further, a storage medium capable of being read by a computer on which this computer program is stored is also provided.

Further, in the present disclosure, while a description has been made by using a content such as soccer or a live performance of an artist, the type of the content is not limited to this, and a game in which a plurality of users (players) can participate via a network is also included.

For example, at the time when a user 3A is playing some game together with an unspecified large number of other users, emotions of the users of a same team with the user 3A may be presented by using nonverbal reactions.

Further, emotion estimation results of each user and an integration result may be retained in the server 2 by a time stamp and a set along a time series of a content. In this way, at the time when reproducing a content afterwards, the client apparatus 1 may acquire the emotion estimation results and the integration result retained in the server 2, and may determine and present nonverbal reactions on the basis of a time stamp of the content being reproduced.

Additionally, the present technology may also be configured as below.

(1)

A client apparatus including:

an acquisition unit that acquires a reaction of a viewing user to a content;

an emotion estimation unit which estimates an emotion of a viewing user based on reaction information of the viewing user acquired by the acquisition unit;

a determination unit that determines emotion expression data representing an emotion estimated by the emotion estimation unit; and an output unit that outputs emotion expression data determined by the determination unit.

(2)
The client apparatus according to (1),
wherein the determination unit determines the emotion expression data based on an emotion for which emotion estimation results of a plurality of viewing users have been integrated.

(3)
The client apparatus according to (2), further including:
a transmission unit that transmits, to a server, information showing an emotion estimated by the emotion estimation unit; and
a reception unit that receives, from the server, information showing the emotion for which the emotion estimation results of the plurality of viewing users have been integrated.

(4)
The client apparatus according to (2) or (3),
wherein the emotion estimation results of the plurality of viewing users are emotion estimation results of specific viewing users.

(5)
The client apparatus according to (2) or (3),
wherein the emotion estimation results of the plurality of viewing users are emotion estimation results of an unspecified large number of viewing users.

(6)
The client apparatus according to (2),
wherein the output unit starts an output of first emotion expression data determined based on an integration of emotion estimation results of specific viewing users, and afterwards starts an output of second emotion expression data determined based on an integration of emotion estimation results of an unspecified large number of viewing users.

(7)
The client apparatus according to (6),
wherein the output unit completes an output of the first emotion expression data, and afterwards starts an output of the second emotion expression data.

(8)
The client apparatus according to (6),
wherein the output unit causes an output of the second emotion expression data to fade in while causing an output of the first emotion expression data to fade out.

(9)
The client apparatus according to (6),
wherein, at the time when starting an output of the second emotion expression data, the output unit lowers an output value of the first emotion expression data more than an output value of the second emotion expression data.

(10)
The client apparatus according to any one of (1) to (9),
wherein determination unit forms the emotion expression data by audio data, text data or drawing data.

(11)
The client apparatus according to (10),
wherein the emotion expression data is an imitative word, an exclamation, a sound effect or an effect line showing a prescribed emotion.

(12)
The client apparatus according to any one of (1) to (11),
wherein the determination unit determines a type of emotion expression data corresponding to at least one of a viewer demographic of the content or an attribute of the viewing user.

(13)
The client apparatus according to any one of (1) to (12),
wherein the acquisition unit collects audio of the viewing user as a reaction of the viewing user.

(14)
The client apparatus according to (13), further including:
an extraction unit that extracts the emotion expression data from the collected audio of the viewing user; and
a transmission unit that transmits the emotion expression data extracted by the extraction unit to a server.

(15)
The client apparatus according to any one of (1) to (14),
wherein the acquisition unit images a face image of the viewing user as a reaction of the viewing user.

(16)
The client apparatus according to any one of (1) to (15),
wherein the output unit outputs the emotion expression data by at least one of audio and a display.

(17)
The client apparatus according to any one of (1) to (16),
wherein the output unit outputs the emotion expression data in coordination with an external apparatus.

(18)
A control method including:
a step of acquiring a reaction of a viewing user to a content;
a step of estimating an emotion of to viewing user based on the acquired reaction information of the viewing user;
a step of determining emotion expression data representing the estimated emotion; and
a step of outputting the determined emotion expression data.

(19)
A system including:
a client apparatus having
an acquisition unit that acquires a reaction of a viewing user to a content,
an emotion estimation unit that estimates an emotion of a viewing user based on reaction information of the viewing user acquired by the acquisition unit,
a determination unit that determines emotion expression data based on an integration result of estimation emotion results received from a server, and
an output unit that outputs emotion expression data determined by the determination unit; and
a server having
an integration unit that integrates emotion estimation results of the viewing users received from a plurality of the client apparatuses.

(20)
A program for causing a computer to function as:
an acquisition unit that acquires a reaction of a viewing user to a content;
an emotion estimation unit that estimates an emotion of a viewing user based on reaction information of the viewing user acquired by the acquisition unit;
a determination unit that determines emotion expression data representing an emotion estimated by the emotion estimation unit; and
an output unit that outputs emotion expression data determined by the determination unit.

REFERENCE SIGNS LIST

1, 1A-1 to 1A-4, 1B-1 to 1B-4 client apparatus
2, 2-1 to 2-4 server
3, 3A to 3D viewing user
4 speaker
10 communication unit
11 sensor
12 reaction information acquisition unit 13 emotion estimation unit
14 extraction unit
15 transmission unit
16 reception unit
17 determination unit
18 output control unit
19 content processing unit
21 reception unit
22 communication unit
23 integration unit
24 specific empathy scene detection unit
25 transmission unit
26 association unit
27 emotion tag generation unit
28 user information DB
30 television apparatus

The invention claimed is:

1. A client apparatus comprising:
at least one sensor that acquires a reaction of a viewing user to a content; and
a processor that is configured to implement
an emotion estimation function which estimates an emotion of a viewing user based on reaction information of the viewing user acquired by the at least one sensor;
a determination function that determines emotion expression data representing an emotion estimated by the emotion estimation function; and
an output function that outputs the emotion expression data determined by the determination function,
in which the emotion expression data represents estimated emotion and is formed of text data of an onomatopoeic word without including an actual voice or actual words from any viewing user and without including a video of the any viewing user,
wherein the determination function determines the emotion expression data based on an emotion for which emotion estimation results of a plurality of viewing users have been integrated, and
wherein the output function starts an output of first data determined based on an integration of emotion estimation results of specific viewing users, and afterwards starts an output of second emotion expression data determined based on an integration of emotion estimation results of an unspecified large number of viewing users.

2. The client apparatus according to claim 1, further comprising:
a transmission function that transmits, to a server, information showing an emotion estimated by the emotion estimation function; and
a reception function that receives, from the server, information showing the emotion for which the emotion estimation results of the plurality of viewing users have been integrated.

3. The client apparatus according to claim 1, wherein the output function completes an output of the first emotion expression data, and afterwards starts an output of the second emotion expression data.

4. The client apparatus according to claim 1, wherein the determination function determines a type of emotion expression data corresponding to at least one of a viewer demographic of the content or an attribute of the viewing user.

5. The client apparatus according to claim 1, wherein the at least one sensor collects audio of the viewing user as a reaction of the viewing user.

6. The client apparatus according to claim 1, wherein the at least one sensor images a face image of the viewing user as a reaction of the viewing user.

7. The client apparatus according to claim 1, wherein the output function outputs the emotion expression data in coordination with an external apparatus.

* * * * *